Patented Oct. 4, 1927.

1,644,420

UNITED STATES PATENT OFFICE.

JOSEPH G. DAVIDSON, OF YONKERS, NEW YORK, ASSIGNOR TO CARBIDE AND CARBON CHEMICALS CORPORATION, A CORPORATION OF NEW YORK.

SOLUTION OF CELLULOSE ESTERS.

No Drawing. Original application filed June 13, 1924, Serial No. 719,891. Divided and this application filed August 16, 1927. Serial No. 213,433.

The invention relates to solutions of cellulose esters, such as are employed, for example, as lacquers for metal; and its object is to provide improved compositions of this class. Many solvents for cellulose esters, such as the nitrate and acetate esters, are known. Butyl and amyl acetates are often used; and acetylene tetrachlorid, ethylene chlorhydrin, and diacetone alcohol $$(CH_3COCH_2COH(CH_3)_2)$$

may also be mentioned. There are many others.

As compared with known solutions of cellulose esters, solutions containing the mono- or dialkyl ethers of ethylene glycol exhibit certain advantageous qualities. The ethers may be used with or without other solvents or diluents to form a vehicle for the cellulose ester, since they are compatible with known solutions of cellulose esters, improve or at least do not injure the film deposited, and are solvents for many gums and resins which are commonly employed in lacquers. Among the compounds of this class there may be mentioned the following

| Compound. | Boiling point (° C.). |
|---|---|
| Monomethyl ether | 125 |
| Dimethyl ether | 83 |
| Monoethyl ether | 135 |
| Diethyl ether | 124 |
| Monopropyl ether | 150 |
| Dipropyl ether | 160 |
| Monoallyl ether | 159 |
| Diisobutyl ether | 181 |

Amyl and butyl acetates have strong disagreeable odors whereas certain of the ethers of the class mentioned, particularly the monoethyl ether, are practically odorless. The ethers contain no acid radicle and do not hydrolyze, and they possess other advantageous characteristics.

The alkyl ethers of ethylene glycol dissolve cellulose nitrate readily, and some of them can be combined with other substances to produce remarkable solvents for cellulose acetate. Thus a mixture of equal parts of monoethyl ether and ethylene dichlorid will dissolve sufficient cellulose acetate to make a lacquer in three or four minutes, giving a clear, non-viscous solution in that time, whereas with some solvents now employed a period of as much as eight or ten hours, with rolling or kneading of the components, is necessary to attain the same result. In connection with the foregoing it is of interest to note that neither the monoethyl ether or ethylene dichlorid is alone a solvent for cellulose acetate.

An excellent lacquer may be made from a solution of cellulose acetate in a mixture of the monoethyl ether and ethylene dichlorid by adding to the solution a small quantity of a high-boiling solvent for the cellulose acetate, such as glycol mono- or diacetate, acetylene tetrachlorid, diacetone alcohol, or the like. This high-boiling addition assists in the production of a transparent adherent film on drying a coat of the lacquer, and as little as 1% or 2% of the high-boiling addition may be effective for this purpose. Solvents and diluents other than those mentioned may also be incorporated in the solution.

Compositions according to my invention may be free from liquids other than the ethylene glycol ethers, but it usually will be preferable to employ an auxiliary solvent or diluent for reasons of economy or to modify the properties of the solution. Useful solutions may be made as follows: Three weights of nitro-cellulose is dissolved in 40 weights of ethylene glycol monoethyl ether, or the diethyl ether, or a mixture of the two. Complete solution is rapidly effected. About 75 weights of benzene is then added. Instead of benzene, acetone, methyl or ethyl alcohol, naphtha, or other diluent may be used, according to the intended use.

This application is a division of my copending application Serial No. 719,891, filed June 13, 1924. The appended claims were copied for interference from Patent 1,533,616, granted on April 4, 1925, to Stanley D. Shipley and Guy C. Given. In these the monoethyl ether of ethylene glycol is designated as "ethyl glycol".

I claim:

1. A composition comprising nitrocellulose and ethyl-glycol.

2. A composition comprising nitrocellulose, ethyl-glycol, and a non-solvent diluent miscible therewith without precipitation of the nitrocellulose.

3. A composition comprising nitrocellulose, ethyl-glycol and a hydrocarbon diluent miscible with the same without precipitation of the nitrocellulose.

4. A composition comprising nitrocellulose, ethyl-glycol and a benzene hydrocarbon.

5. A nitrocellulose solvent mixture, the essential constituent of which is ethyl-glycol ($OHCH_2CH_2OC_2H_5$).

6. A nitrocellulose solvent comprising a mixture of ethyl-glycol and a non-solvent of nitrocellulose miscible as a diluent with said mixture.

7. A nitrocellulose solvent comprising a mixture of ethyl-glycol and a hydrocarbon miscible as a diluent with said mixture.

8. A nitrocellulose solvent comprising a mixture of ethyl-glycol and a benzene hydrocarbon.

9. A nitrocellulose solvent comprising a mixture of ethyl-glycol and benzene.

10. The process of forming a body of nitrocellulose which comprises dissolving nitrocellulose in a solvent consisting essentially of ethyl-glycol ($OHCH_2CH_2OC_2H_5$) and evaporating said mixture.

11. The process of forming a body of nitrocellulose comprising dissolving nitrocellulose in a mixture of ethyl-glycol and a non-solvent for nitrocellulose and causing the said mixture to evaporate.

In testimony whereof, I affix my signature.

JOSEPH G. DAVIDSON.